(12) United States Patent
Boudewyns et al.

(10) Patent No.: US 8,004,507 B2
(45) Date of Patent: Aug. 23, 2011

(54) REMOTE STATUS MULTIFUNCTION DISPLAY FOR A TRANSPORT VEHICLE

(75) Inventors: Philllip R. Boudewyns, Apple Valley, MN (US); Matthew Nelson, Cottage Grove, MN (US); Jerry Jessen, Bloomington, MN (US)

(73) Assignee: Thermo King Corporation, Minneapolis, MN (US)

( * ) Notice: Subject to any disclaimer, the term of this patent is extended or adjusted under 35 U.S.C. 154(b) by 1227 days.

(21) Appl. No.: 11/674,522

(22) Filed: Feb. 13, 2007

(65) Prior Publication Data

US 2007/0195079 A1 Aug. 23, 2007

Related U.S. Application Data

(60) Provisional application No. 60/774,845, filed on Feb. 17, 2006.

(51) Int. Cl.
*G09G 5/00* (2006.01)
(52) U.S. Cl. .................................. 345/204; 345/207
(58) Field of Classification Search ............ 345/87–103, 345/204–215; 340/425–442
See application file for complete search history.

(56) References Cited

U.S. PATENT DOCUMENTS

| D509,151 S | 9/2005 | Takach et al. | |
|---|---|---|---|
| D518,744 S | 4/2006 | Rosen | |
| 2003/0001734 A1* | 1/2003 | Schofield et al. | 340/442 |
| 2003/0069684 A1* | 4/2003 | Reimer | 701/123 |
| 2004/0207514 A1* | 10/2004 | Lesesky et al. | 340/431 |

\* cited by examiner

*Primary Examiner* — Vijay Shankar
(74) *Attorney, Agent, or Firm* — Michael Best & Friedrich LLP (57) ABSTRACT

A display for a transport unit. The transport unit includes a vehicle, a trailer that defines a space, and a sensor that is in communication with the transport unit and that senses a parameter of the transport unit. The display unit includes a housing that is attachable to the trailer, and a display portion coupled to the housing. The display portion includes a screen configured to display the parameter. A controller is in electrical communication with the display portion to display the parameter on the screen. The controller is programmed to selectively switch the screen between a forward view mode and a mirror view mode such that the parameter is readable on the screen from outside the vehicle and from inside the vehicle based on a relationship between the vehicle and the trailer.

14 Claims, 8 Drawing Sheets

REMOTE STATUS MULTIFUNCTION DISPLAY FOR A TRANSPORT VEHICLE

CROSS-REFERENCE TO RELATED APPLICATIONS

This application claims priority to U.S. Provisional Application No. 60/774,845, filed Feb. 17, 2006. The entire contents of this prior application are hereby incorporated by reference herein.

BACKGROUND

The present invention relates to a display for a transport refrigeration system. More particularly, the present invention relates to a multifunction display that is configured to vary between a forward view mode and a mirror view mode.

Transport vehicles (e.g., straight trucks and tractor-trailers) are often used to transport cargo that must be maintained at predetermined conditions during transportation to preserve the quality of the cargo. The cargo is transported, stored, or otherwise supported within a conditioned space of the transport vehicle (e.g., a trailer, etc.). The cargo may be food, agricultural goods or various other temperature critical items that must be maintained at a predetermined temperature. Typically, transport vehicles that transport temperature sensitive cargo are constructed with the conditioned space maintained at a predetermined temperature by a refrigeration unit attached to the trailer. Often, the refrigeration unit is controlled by a temperature control unit mounted to the trailer adjacent the refrigeration unit. These temperature control units are configured to monitor and control the refrigeration units, and include a display that is operable to show the temperature of the conditioned space.

Precise control of the conditioned space is needed to maintain the cargo at the predetermined conditions, which requires constant monitoring by an operator of the transport vehicle. Most transport vehicles require the operator to stop the transport vehicle and exit the transport vehicle to view a display of the temperature control unit. However, these temperature control units are located on the transport vehicle such that it is unreadable by the operator from within a cabin of the transport vehicle. The display on the temperature control unit is also difficult to view because the display is insufficiently illuminated.

The transport vehicle includes a primary fuel reservoir that is operable to fuel the truck. Typically, the refrigeration unit is coupled to a secondary fuel reservoir that is separate from the primary reservoir. Some transport vehicles include a float level gauge with a display attached to an end of the secondary fuel reservoir. Other vehicles display the fuel level on the temperature control unit. However, the operator, when positioned within the vehicle, is unable to see the fuel level of the secondary reservoir. As is sometimes the case, the operator may be unaware that the fuel for the refrigeration unit is low or has run out, causing disruption of the operation of the refrigeration unit. Further, locating the fuel level gauge on the secondary reservoir or on the temperature control unit makes viewing the fuel level difficult when the transport vehicle is parked in a staging area side-by-side with other vehicles.

Some transport vehicles include a temperature control unit that displays the temperature in either a forward view or in a mirror view. When the transport vehicle includes the forward view, the operator may view the temperature from outside the transport vehicle, but not from the inside of the vehicle. In mirror view, the temperature control unit display is visible and readable by the operator from inside the cabin of the transport vehicle. However, these temperature control unit displays cannot be automatically switched between the forward view and the mirror view. Other displays include a manual switch to vary between the forward view and the mirror view. Typically, the manual switch is adjacent the temperature control unit and requires the operator to vary the switch from outside the vehicle. Often, manual operation of the switch is overlooked and the display is shown in an undesired view (e.g., forward view when the vehicle is traveling, etc.), and inhibits viewing of the temperature of the space.

SUMMARY

In one embodiment, the invention provides a display for a transport unit. The transport unit includes a vehicle, a trailer that defines a space, and a sensor that is in communication with the transport unit and that senses a parameter of the transport unit. The display unit includes a housing that is attachable to the trailer, and a display portion coupled to the housing. The display portion includes a screen configured to display the parameter. A controller is in electrical communication with the display portion to display the parameter on the screen. The controller is programmed to selectively switch the screen between a forward view mode and a mirror view mode such that the parameter is readable on the screen from outside the vehicle and from inside the vehicle based on a relationship between the vehicle and the trailer.

In another embodiment, the invention provides a transport unit that includes a trailer and a vehicle. The trailer defines a space that has at least one zone, and the vehicle is attachable to the trailer. The vehicle includes a passenger compartment and a rear view mirror. The sensor is m communication with the transport unit and senses a parameter of the transport unit. The transport unit further includes a housing coupled to the trailer, and a display that has a screen to display the parameter. A controller is attached to the trailer and in communication with the space. The controller is in electrical communication with the sensor and the display, and is programmed to selectively switch the screen between a forward view mode and a mirror view mode based on a relationship between the vehicle and the trailer.

In yet another embodiment, the invention provides a transport unit that includes a trailer that defines a space, and a fuel reservoir that is coupled to the trailer. The transport unit also includes a vehicle that is attachable to the trailer, and that includes a passenger compartment. A temperature control unit is attached to the trailer and operable to vary the conditions of the space. A sensor is in communication with the fuel reservoir, and senses a fuel level of the fuel reservoir. The transport unit also includes a controller coupled to the trailer and in electrical communication with the sensor to receive a signal indicative of the fuel level from the sensor. The controller includes a first display that displays the fuel level such that the fuel level is readable from outside the passenger compartment. A second display is coupled to the trailer and in electrical communication with the controller. The second display receives a signal indicative of the fuel level from the controller based on the signal received from the sensor such that the fuel level is selectively readable from inside the passenger compartment and from outside the passenger compartment.

In yet another embodiment, the invention provides a method of displaying a parameter of a transport unit. The method includes providing a transport unit including a trailer, and a vehicle attachable to the trailer. The method also includes providing a controller coupled to the trailer, and a display in electrical communication with the controller. The method further includes sensing the parameter with a sensor that is in communication with the transport unit, delivering a signal indicative of the parameter to the controller, and displaying the parameter on the display, and automatically adjusting the display between a forward view mode and a mirror view mode on the display based on a relationship between the vehicle and the trailer.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
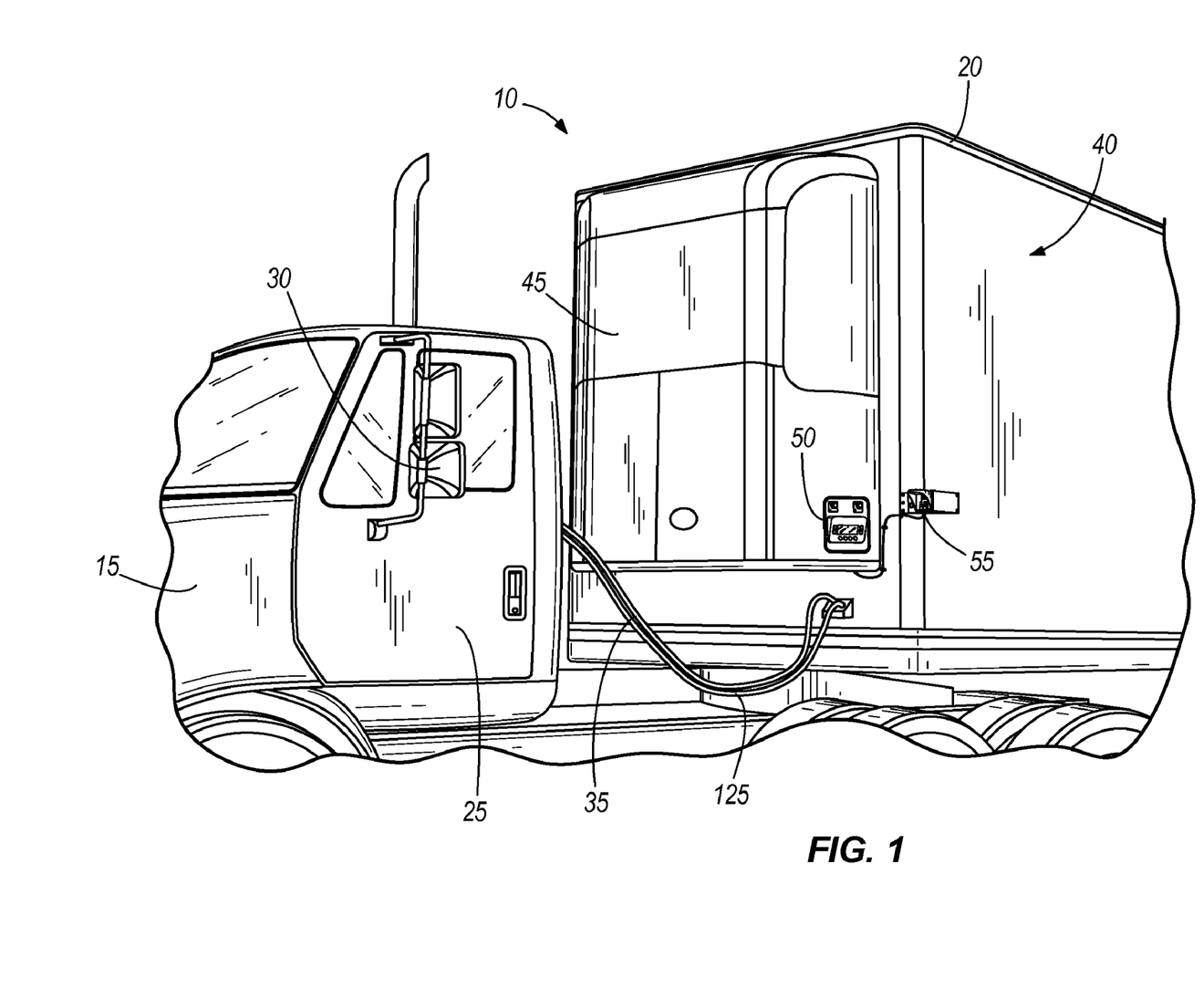
FIG. 1 is a perspective view of a transport vehicle including a truck, a trailer, and a refrigeration unit having a microcontroller and a multifunction display.

FIG. 1 shows a transport vehicle 10 including a vehicle 15 (e.g., straight truck, tractor, etc.) and a trailer 20. The vehicle 15 moves the trailer 20 from one location to another and includes a cabin 25, a rear view mirror 30, and a power cord 35 (e.g., Susie-Cord, etc.). A primary fuel reservoir (not shown) supplies fuel to an engine (not shown) of the vehicle 15. The rear view mirror 30 allows an operator of the vehicle 15 to view objects (e.g., the trailer 15, other vehicles, etc.) from the cabin 25. The cord 35 electrically couples to the trailer to power electrical components on the trailer 20.

The trailer 20 transports cargo (not shown) within a conditioned space 40 that must be maintained at predetermined conditions (e.g., temperature, humidity, etc.) during transportation to preserve the quality of the cargo. The cargo may be food, agricultural goods or various other temperature critical items (e.g., medical supplies, etc.) that must be maintained at the predetermined conditions.

The trailer 20 includes a refrigeration unit 45, a refrigeration unit microcontroller 50, and a multifunction display 55. The refrigeration unit 45 maintains the cargo at a predetermined temperature and may include one or more refrigeration components (not entirely shown), such as one or more compressors, a condenser, an evaporator, one or more fans, a receiver, and one or more expansion valves. A prime mover (not shown) is coupled to the refrigeration unit 45 and is operable to drive the refrigeration unit 45. The prime mover initiates a predetermined refrigeration cycle (i.e., a cooling cycle or a heating cycle), and to end the predetermined refrigeration cycle after the predetermined conditions of the space have been met. The starting and stopping of the prime mover is defined by the requirements of suitably conditioning the space 40. Alternatively, the prime mover can be operated continuously to provide adequate conditioning of the space 40. The prime mover is connected to a secondary fuel reservoir (not shown) separate from the primary reservoir. In other embodiments, the prime mover may be connected to a fuel source shared with the vehicle engine. In still other embodiments, the prime mover may be an electric motor.

Figure 2:
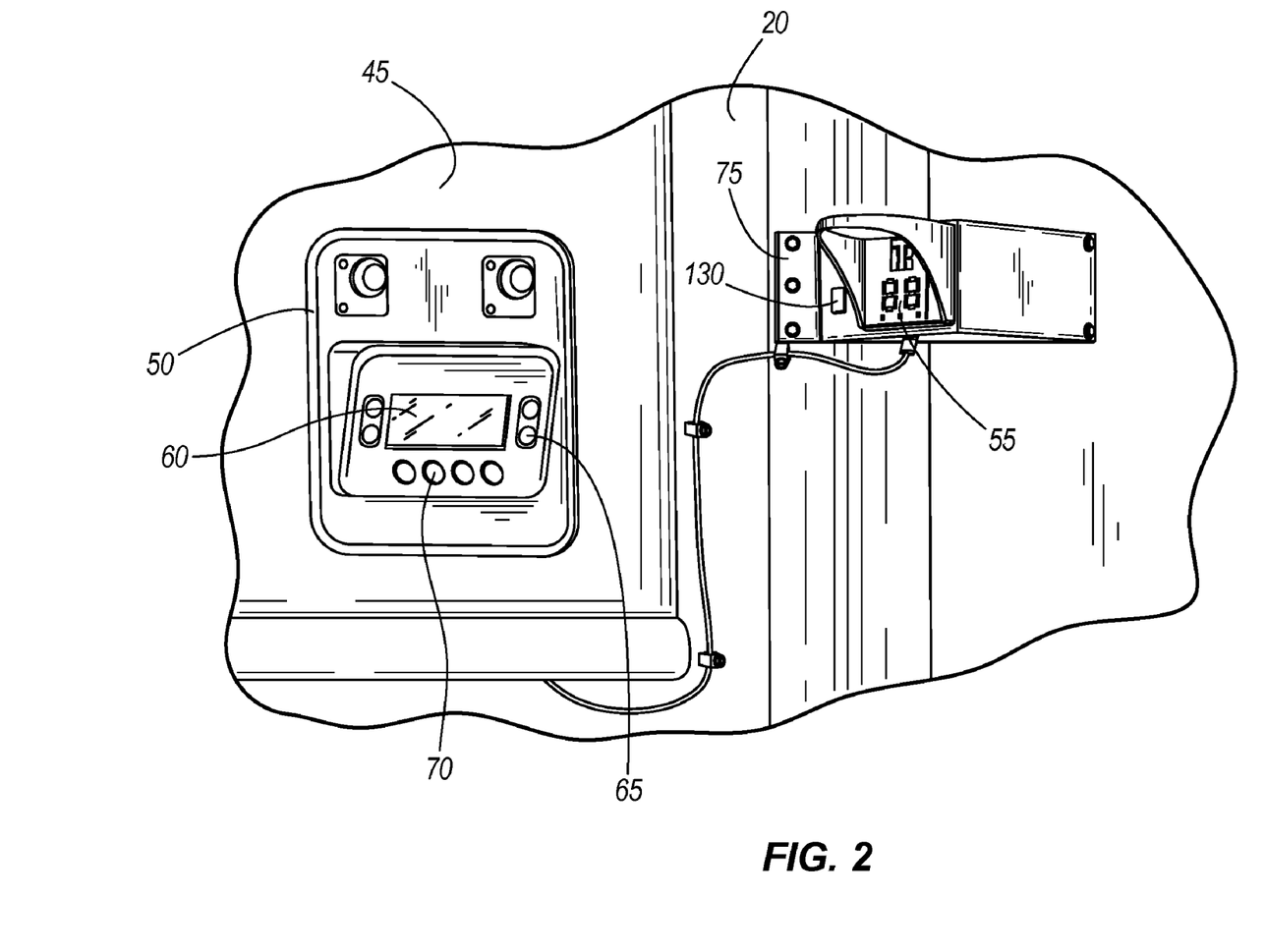
FIG. 2 is a perspective view of the trailer of FIG. 1, including the microcontroller and the multifunction display.
Figure 3:
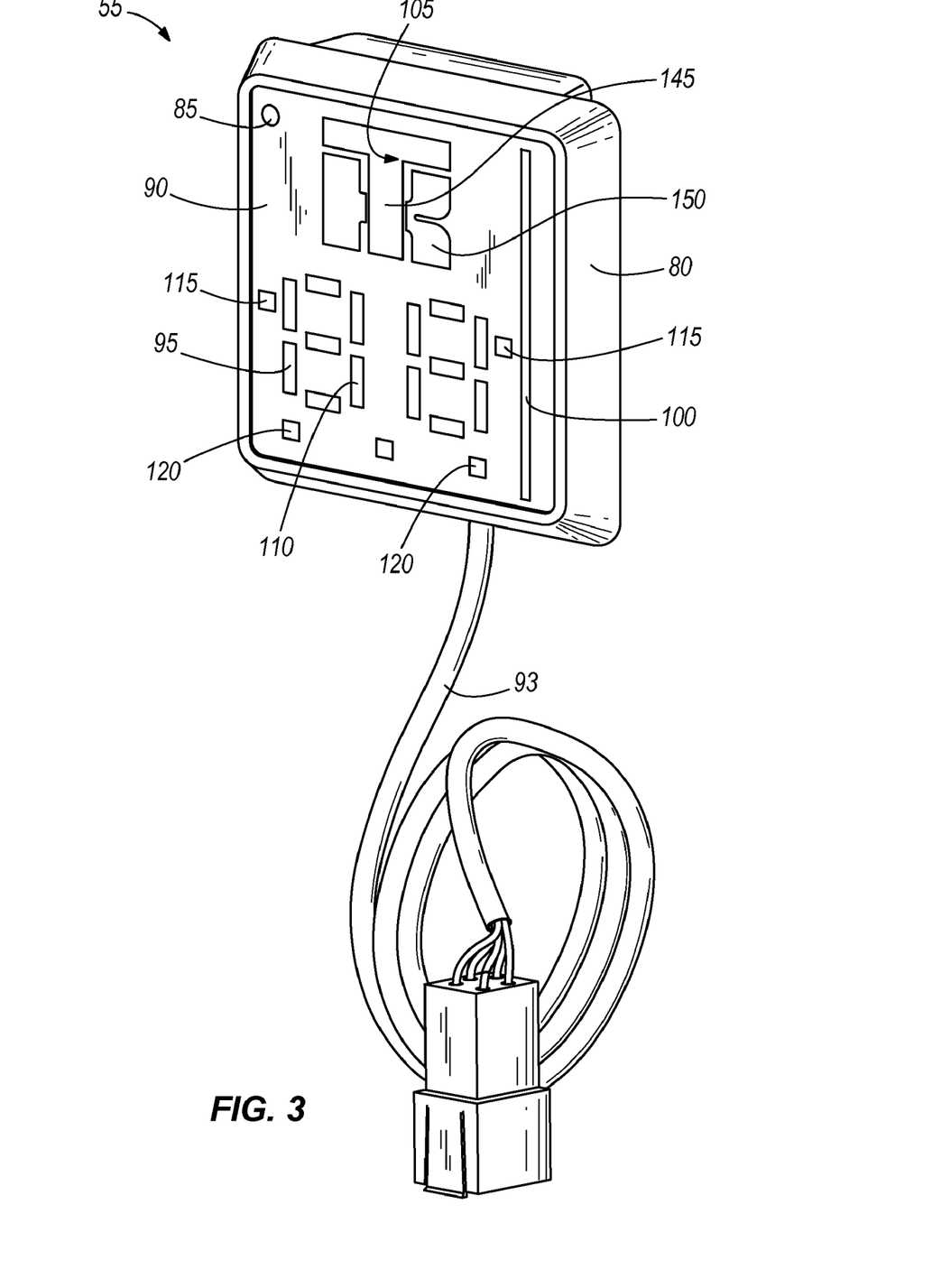
FIG. 3 is a perspective view of the multifunction display of FIG. 2.

FIG. 2 shows one embodiment of the microcontroller 50 and the multifunction display 55 that is disposed on the trailer 20 adjacent the refrigeration unit 45. The microcontroller 5o works with a controller area network to monitor and control the temperature of the space 40, to monitor a fuel level of the secondary reservoir, and to monitor and control a control status of the refrigeration unit 45. The microcontroller 50 includes a monitor 60 and a temperature control 65 having a plurality of inputs 70. The monitor 60 facilitates display of aspects of the refrigeration unit 45, including the temperature, the fuel level, and the control status. The temperature control 65 is in communication with the refrigeration unit 45 to facilitate local control of the temperature of the space using the plurality of inputs 70. In some constructions, the temperature of the space is determined from a return air temperature in the refrigeration unit 45. Other constructions may determine the temperature from other locations, such as from the space 40. One example of the microcontroller 50 includes Thermo King's SR2 controller, although other controllers may be used in place of the SR2 controller.

The multifunction display 55 is coupled to the trailer 20 adjacent the microcontroller 50. The multifunction display 55 is visible from the cabin 25 through the rear view mirror 30. A bracket 75 attaches the multifunction display 55 to the trailer 20 using common fasteners (e.g., screw, bolt, etc.). The bracket 75 is coupled to the trailer 20 using additional fasteners.

FIGS. 3-7 illustrate the multifunction display 55 including a housing 80, a dimming feature or optical sensor 85, and a screen 90 coupled to a portion of the housing 80. The multifunction display 55 is in electrical communication with the microcontroller 50 and a power source (not shown) through an electrical connector 93 that extends from the housing 80. The housing 80 defines a space that is operable to support a microprocessor or other similar device (not shown) to communicate with the microcontroller 50 and to vary the information that is displayed on the screen 90.

The optical sensor 85 automatically adjusts the brightness of the screen 90. In one embodiment, the optical sensor 85 automatically brightens the screen 90 during daylight operation, and automatically dims the brightness of the screen 90 during nighttime operation. The automatic brightness adjustment allows the operator to adequately view the screen 90 under various conditions. The optical sensor 85 is always active to reduce glare on the screen 90 that is visible by the operator and to prolong the life of the multifunction display 55.

The screen 90 includes a real-time temperature portion 95, a real-time fuel portion 100, and a real-time control status portion 105. The temperature portion 95 is in communication with the microcontroller 50 such that the temperature displayed on the screen 90 is similar to, or the same as, the temperature measured by the microcontroller 50. The multifunction display 55 obtains the temperature based on a first predetermined interval (e.g., one second, 2 seconds, etc.). The temperature on the screen 90 may be shown in Fahrenheit scale and Celsius scale. The multifunction display 55 varies the scale depending on the connection of the multifunction display 55 with the microcontroller 50.

The temperature portion 95 includes a first temperature indicator 110, a second temperature indicator 115, and at least one temperature zone indicator 120. The first temperature indicator 110 includes a plurality of light emitting diodes (LEDs) to illuminate the temperature value on the screen 90. The second temperature indicator 115 is adjacent the first temperature indicator 110 and includes at least one LED to selectively illuminate in response to whether the temperature value is positive or negative. The second temperature indicator 115 is disposed on two sides of the first temperature indicator 110 to facilitate viewing of the temperature in different modes, as discussed in detail below. The first and second temperature indicators 110, 115 may include any color of LEDs, such as white and amber LEDs. In other constructions, the first and second temperature indicators may include a digital indicator (not shown) in place of the LEDs.

Figure 4:
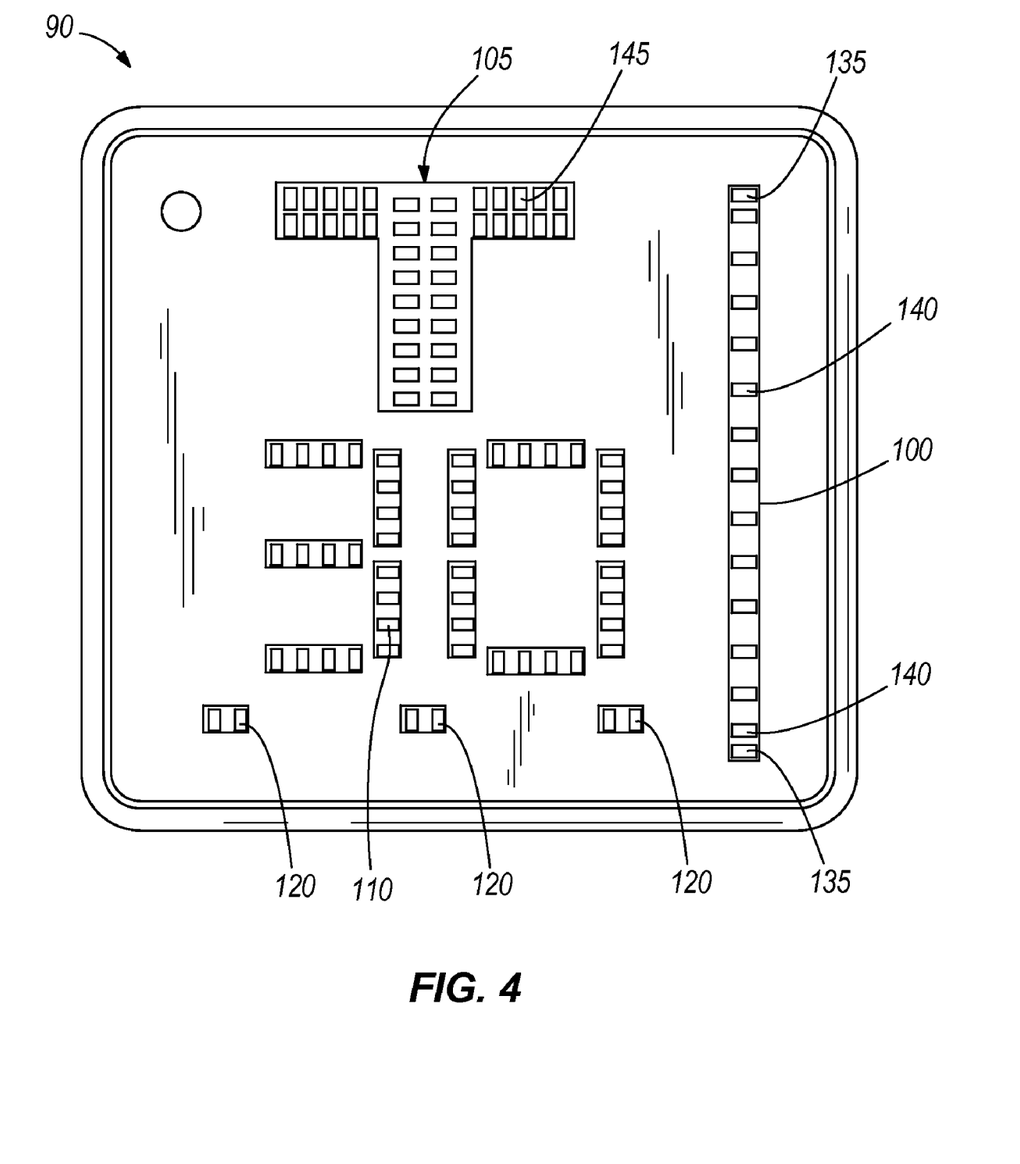
FIG. 4 is a front view of the multifunction display of FIG. 2 in a forward view mode.
Figure 5:
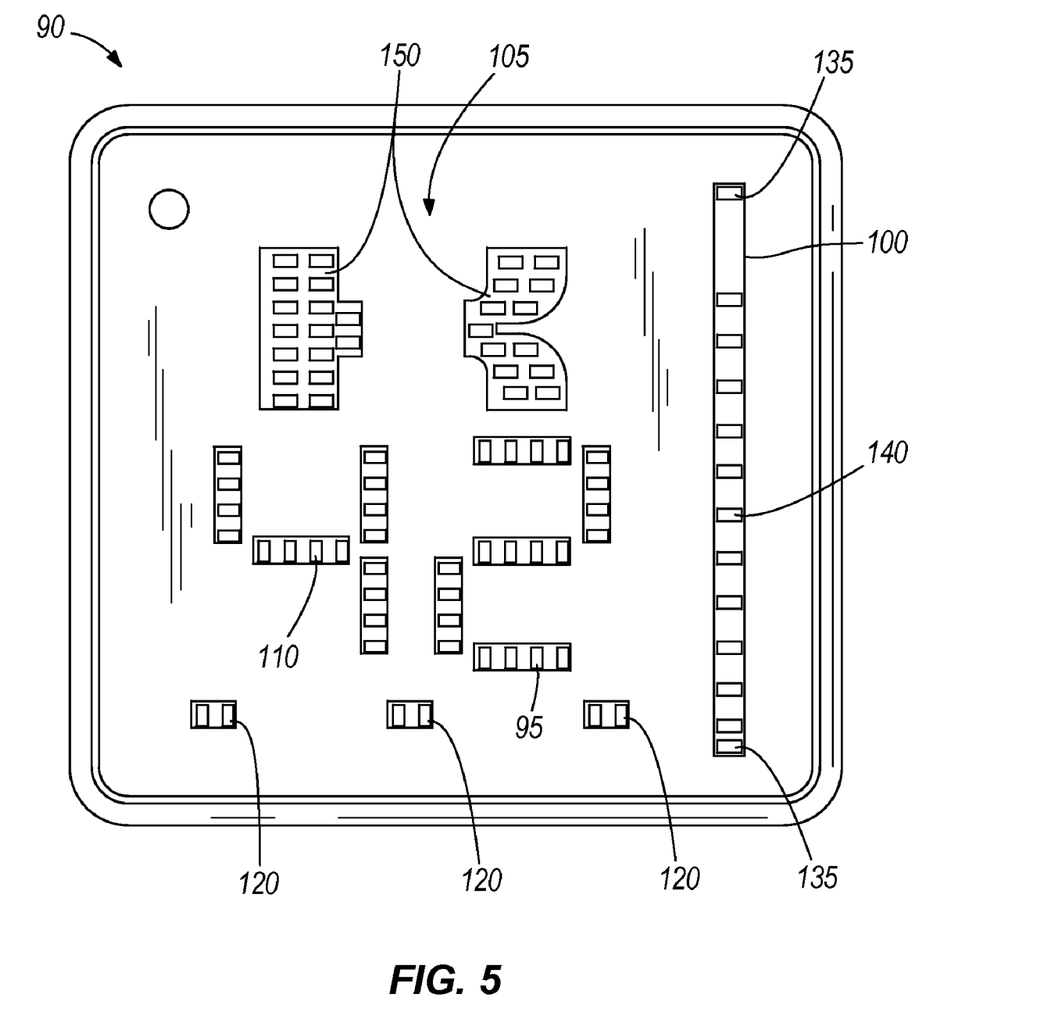
FIG. 5 is another front view of the multifunction display of FIG. 2 in the forward view mode.

The temperature portion 95 further includes a forward view mode and a mirror view mode. The multifunction display 55 switches automatically and selectively between the forward view mode and the mirror view mode in response to attachment and detachment of the vehicle 15 and the trailer 20. The multifunction display 55 defaults to the forward view mode when the vehicle 15 is disengaged from the trailer 20. The forward view mode allows the operator to view the screen 90 from outside the cabin 25 when the vehicle 15 is disengaged from the trailer 20. For example, FIGS. 4 and 5 show the screen 90 including the temperature in the forward view mode such that the operator is able to view the temperature directly from the screen 90. The operator is thus able to view the temperature portion 95, the fuel portion 100, and the control status portion 105 from outside the cabin 25.

Figure 6:
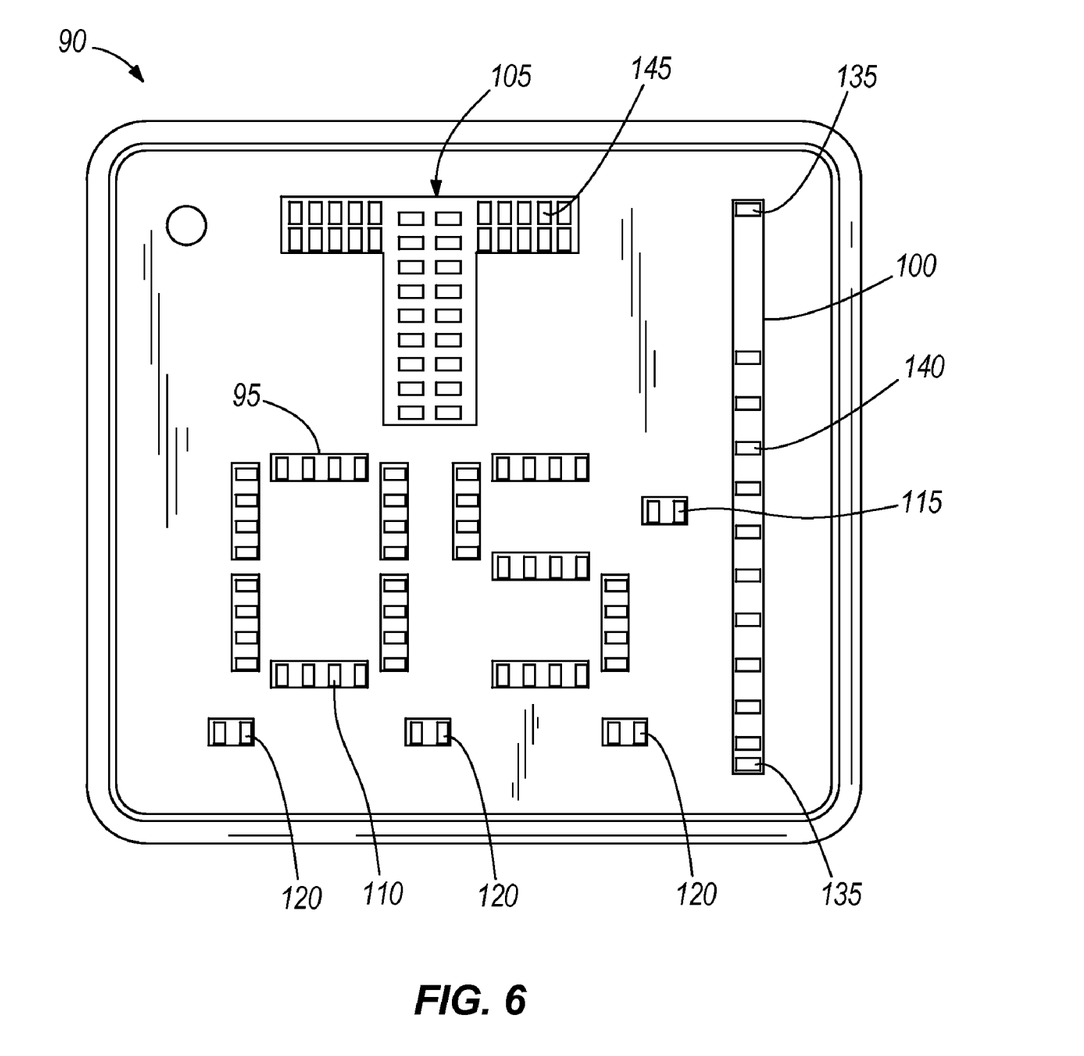
FIG. 6 is yet another front view of the multifunction display of FIG. 2 in a mirror view mode.

The mirror view mode allows the operator to view the screen 90 from the cabin 25 using the rear view mirror 30. The operator is thus able to continuously monitor the temperature portion 95, the fuel portion 100, and the control status portion 105 of the refrigeration unit. For example, FIG. 6 illustrates the temperature of the space 40 as a negative temperature in the mirror view mode. The second temperature indicator 115 is illuminated on a side of the first temperature indicator 110 such that the screen 90 is readable by the operator by looking through the rear view mirror 30. The automatic switching between the forward view mode and the mirror view mode allows the operator to focus on other tasks associated with the transport vehicle 10 because the temperature is shown in the appropriate view without direct operation of the multifunction display 55 by the operator.

One embodiment of the automatic switching between the forward view mode and the mirror view mode includes a sensor wire 125 (see FIG. 1) attached to the cord 35. The cord 35 is adapted to include the sensor wire 125 without additional terminals on the trailer 20 to receive the sensor wire 125. The sensor wire 125 generates a signal indicative of power from a voltage source of the vehicle 15 and communicates the signal to the multifunction display 55. The multifunction display 55 varies between the forward view mode and the mirror view mode based on the signal from the sensor wire 125 that is indicative of the voltage from the vehicle 15.

Another embodiment of the automatic switching between the forward view mode and the mirror view mode includes a sensor 130 (see FIG. 2) attached to or adjacent the multifunction display 55. The sensor 130 is operable to sense the proximity of the vehicle 15 with regard to the position of the trailer 20 by emitting a signal (e.g., ultrasonic wave, etc.) in a direction away from a front of the trailer 20. The multifunction display 55 varies between the forward view mode and the mirror view mode in response to the proximity of the vehicle 15 based on a predetermined distance programmed into the multifunction display 55. In some embodiments, the automatic switching between the forward view mode and the mirror view mode can occur when the truck is in substantial proximity to the trailer. In other embodiments, the automatic switching between the forward view mode and the mirror view mode can occur when the truck is attached to the trailer or detached from the trailer.

Regardless of whether the sensor wire 125, the sensor 130, or other signal-generating component is used to indicate a relationship between the vehicle 15 and the trailer 20, the multifunction display 55 automatically switches between the forward view mode and the mirror view mode based on a relationship between the vehicle 15 and the trailer 20. In still other embodiments, the multifunction display 55 may further include an input device (not shown) to allow manual change of the multifunction display 55 between forward view mode and the mirror view mode while the tractor 15 is attached to the trailer 20 (e.g., while the tractor-trailer assembly is attached and non-moving).

The temperature zone indicator 120 is indicative of a zone of the conditioned space 40 that is monitored and controlled by the microcontroller 50. The zone indicator 120 includes at least one LED disposed on the screen 90 below the first temperature indicator 110. The zone indicator 120 may include any color of LED, such as a white LED and an amber LED. The embodiment of the screen 90 shown in FIGS. 3-7 includes a capacity to display up to three separate temperature zone indicators 120 on the screen. Each zone indicator 120 is selectively illuminated on the multifunction display based on a time interval that is the same as the first predetermined interval. The zone indicator 120 may include fewer than three or more than three temperature zone indicators 120 to show the number of zones that are monitored. The quantity of temperature zone indicators 120 on the screen 90 is for illustrative purposes only and the invention should not be so limited.

FIGS. 3-6 illustrate the fuel portion 100 disposed on the screen 90 adjacent a side of the temperature portion 95. A sensor (not shown) is in communication with the fuel reservoir to measure a fuel level of the reservoir. In some embodiments, the fuel level can be displayed on a gauge (not shown) attached to the fuel reservoir.

The microcontroller 50 is in electrical communication with the sensor to receive a signal indicative of a real-time fuel level of the fuel reservoir, and to display the fuel level on the display 60. In some embodiments, the microcontroller 50 displays the sensed fuel level on the display 60 as a percentage-of-fuel value. For example, when the fuel reservoir is at about fifty-percent capacity, the microcontroller 50 displays the fuel level as fifty percent. The fuel level is disposed on the display 60 such that the operator may view the real-time fuel level from outside the cabin 25.

The microcontroller 50 shares the real-time fuel level with the multifunction display 50 through the controller area network such that the multifunction display 55 and the microcontroller 50 display a similar fuel level at a given time. In other embodiments, a control box (not shown) aids in communicating the fuel level between the microcontroller 50 and the multifunction display 55 when a controller area network is unavailable. The fuel level is obtained by the multifunction display 55 from the microcontroller 50 based on a second predetermined interval (e.g., two seconds, five seconds, etc.). The second predetermined interval may be the same or different from the first predetermined interval. The fuel portion 100 is disposed on the screen 90 such that the operator may view the real-time fuel level in the forward view mode and the reverse view mode.

The fuel portion 100 includes gauge indicators 135 and a plurality of fuel level indicators 140. The gauge indicators 135 are illuminated to define outer limits of the fuel portion 100, and include at least one LED having an amber color, although other colors of the LEDs are possible. FIGS. 3-6 illustrate the gauge indicators 135 adjacent atop and a bottom of the fuel portion 100, although other configurations of the fuel portion 100 may place the gauge indicators 135 in other locations.

The plurality of fuel level indicators 140 include LEDs that display the real-time fuel level of the secondary fuel reservoir. The fuel level indicators 140 change color based on predetermined fuel levels. For example, when the fuel level is above one-quarter full, the fuel level indicators 140 are shown as white LEDs. When the fuel level is equal to or less than one-quarter full, the fuel level indicators 140 are shown as amber LEDs. Other constructions of the fuel portion 100 may include other predetermined fuel levels (e.g., one-half full, one-eighth full, etc.) that are operable to change the color of the fuel level indicators 140. The color of the LEDs may also vary from the white and amber LEDs described herein. In still other constructions, the fuel level indicators 140 increase in scale when the fuel level drops below a predetermined fuel level.

FIGS. 3-7 show the control status portion 105 on the screen 90. The multifunction display 55 receives a signal from the microcontroller 50 indicative of the control status of the refrigeration unit 45 based on a third predetermined interval. The third predetermined interval may be the same or different from the first and second predetermined intervals described above. The status portion 105 includes a status marker having a first status indicator 145 and a second status indicator 150. The first status indicator 145 includes at least one LED having a first color, such as white, and selectively illuminates when the refrigeration unit 45 is under normal operating conditions. Normal operating conditions include, but are not limited to, the temperature of the space 40 maintained within a predefined range and an adequate fuel level to operate the refrigeration unit 45. Under normal operating conditions, each zone indicator 120 selectively illuminates based on the first predetermined interval to indicate the zone that is currently monitored. FIGS. 4 and 6 illustrate two examples of the control status of the refrigeration unit 45 in normal operating conditions.

The second status indicator 150 selectively illuminates when a check alarm condition of the refrigeration unit 45 occurs, and includes at least one LED. In some constructions, the second status indicator 150 may include a color (e.g., amber, red, etc.) that is different from the first status indicator 145. FIG. 5 illustrates the multifunction display 55 after a check alarm condition has been received from the microcontroller 50. The check alarm condition includes, but is not limited to, the temperature of the space 40 outside the predetermined range or a substantially low fuel level.

Figure 7:
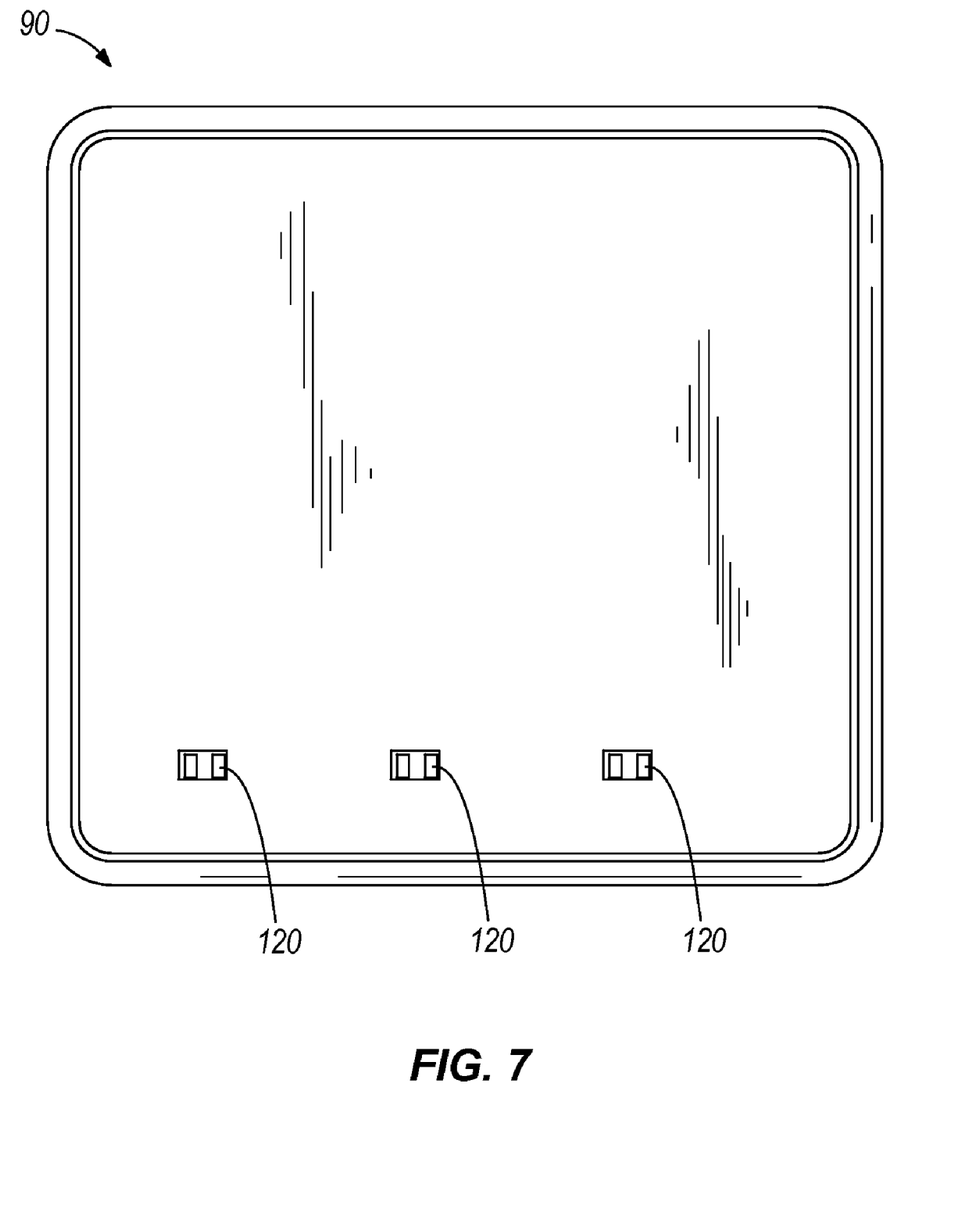
FIG. 7 is yet another front view of the multifunction display of FIG. 2.

FIG. 7 illustrates a shutdown alarm condition of the refrigeration unit 45 on the status portion 105. When a shutdown alarm condition occurs, the microcontroller 50 sends a signal indicative of the shutdown alarm condition to the multifunction display 55, which in turn varies from the normal operating condition and the check alarm condition to the shutdown alarm condition. The shutdown alarm condition is operable to blank the screen 90 except for the zone indicator 120. The zone indicator 120 remains illuminated to indicate that the shutdown alarm condition has occurred in the refrigeration unit 45. Illumination of the zone indicator 120 also indicates that the multifunction display 55 has power and is operating. In embodiments including more than one zone indicator 120, all zone indicators are illuminated when the multifunction display 55 varies from the normal shutdown condition and the check alarm condition to the shutdown alarm condition. The microcontroller 50 generates a signal indicative of the shutdown alarm condition when the refrigeration unit 45 is inoperable, such as when the refrigeration unit 45 is not working properly or the secondary fuel reservoir is empty.

Figure 8:
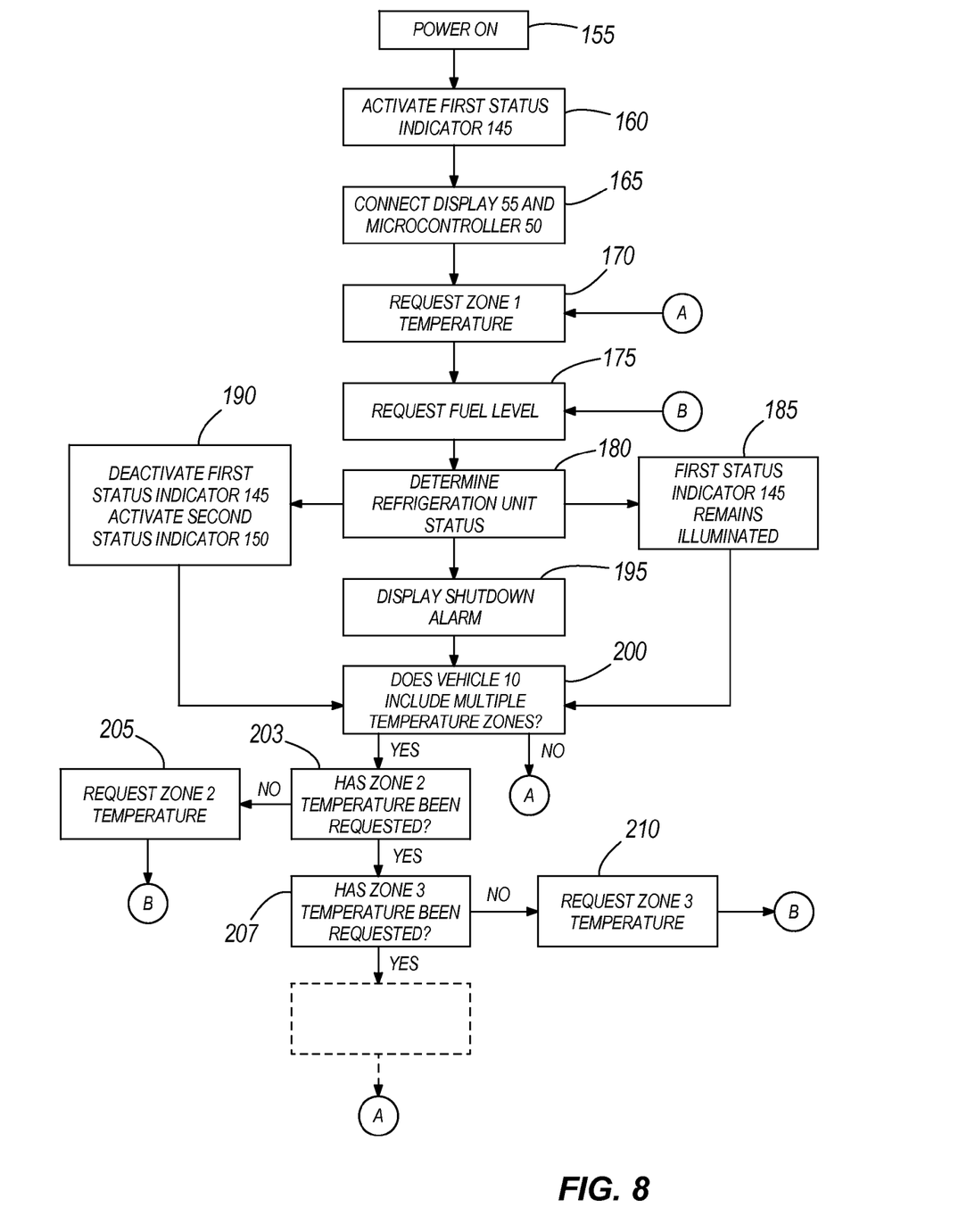
FIG. 8 is a flow chart diagram of the operation of one embodiment of the multifunction display of FIG. 2.

FIG. 8 illustrates one embodiment of operation of the multifunction display 55. At step 155 the refrigeration unit 45, the microcontroller 50, and the multifunction display 55 are turned on. The status portion 105 illuminates the first status indicator 145 upon startup of the refrigeration unit 45 at step 160. The multifunction display 55 connects to the microcontroller 50 at step 165. At step 170, the multifunction display 55 obtains the temperature of a first zone of the space 40 from the microcontroller 50 and displays the temperature on the temperature portion 95. The multifunction display 55 repeatedly checks the temperature of the first zone based on the first predetermined interval. After predetermined cycle operations (e.g., four), the multifunction display 55 moves to step 175 and receives the signal indicative of the fuel level from the microcontroller 50 based on the second predetermined interval and shows the fuel level on the fuel portion 100. The multifunction display 55 then receives the signal indicative of the status of the refrigeration unit 45 at step 180 based on the third predetermined interval. The multifunction display 55 displays the status of the refrigeration unit 45 on the status portion 105.

At step 180, the multifunction display 55 determines the status of the refrigeration unit 45 through the microcontroller 50. When there has been no alarm condition or shutdown condition signal generated by the microcontroller 50, the first status indicator 145 remains illuminated on the screen 90 at step 185. The multifunction display 55 deactivates the first status indicator 145 and illuminates the second status indicator 150 on the screen 90 at step 190 if the microcontroller 50 generates the check alarm condition. If the microcontroller 50 generates a signal indicative of the shutdown alarm condition, the multifunction display 55 will blank the screen 90 at step 195 The zone indicator 120 remains illuminated on the otherwise blank screen 90.

The multifunction display determines whether the transport vehicle 10 includes more than one temperature zone that is cooled by the refrigeration unit 45 at step 200 after determining the status of the refrigeration unit 45 at step 180 and changing the status marker according to the operating condition of the refrigeration one of the steps 185, 190, 195. If the answer at step 200 is "No", the process returns to step 170 and repeats as described above. If the answer at step 200 is "Yes" (i.e., the vehicle includes more than one temperature zone), then the multifunction display 55 determines whether the temperature of a second zone of the space 40 has been requested at step 203. If the temperature of the second zone has not been requested at step 203 (i.e., the answer at step 203 is "No"), the multifunction display 55 obtains the temperature of the second zone from the microcontroller 50 at step 205, and displays the temperature of the second zone on the temperature portion 95.

The multifunction display 55 repeatedly checks the temperature of the second zone based on the first predetermined interval. After predetermined cycle operations (e.g., four), the process returns to step 175 and the multifunction display 55 obtains the signal indicative of the fuel level at step 175 and the signal indicative of the status of the refrigeration unit 45 at step 180 as described above. In a transport vehicle 10 including two temperature zones, the process shown in FIG. 8 returns to step 170 and repeats as described above.

When a third temperature zone of the space 40 is available in the transport vehicle 10, the multifunction display 55 determines at step 207 whether the temperature of the third zone has been requested. Generally, the process returns to step 170 after the multifunction display 55 has determined that the temperature of each temperature zone has been requested (e.g., the answer is "Yes" at steps 203, 207). For example, in embodiments with three temperature zones, the process returns to step 170 after the multifunction display 55 determines that the temperature of the third zone has been requested (i.e., the answer at step 207 is "Yes"). In some embodiments, if the temperature of the third zone has already been requested, the multifunction display 55 determines whether the temperature of a fourth temperature zone of the space 40, if available, has been requested.

If the temperature of the third zone has not been requested at step 207 (i.e., the answer at step 207 is "No"), the multifunction display 55 obtains the temperature of the third zone from the microcontroller 50 at step 210, and displays the temperature of the third zone on the temperature portion 95. In some embodiments, when the third temperature zone of the space 40 is available in the transport vehicle 10, the multifunction display can move directly from one of steps 185, 190, 195 to step 210 to obtain the temperature of the third zone from the microcontroller 50.

The multifunction display 55 repeatedly checks the temperature of the third zone based on the first predetermined interval. After predetermined cycle operations (e.g., four), the process returns to step 175 and the multifunction display 55 obtains the signal indicative of the fuel level at step 175 and the signal indicative of the status of the refrigeration unit 45 at step 180 as described above. In embodiments where the transport vehicle 10 includes three temperature zones, the process of the multifunction display 55 moves from one of steps 185, 190, 195 to step 170 and repeats. In embodiments where more than three temperature zones are available, the process for the multifunction display 55 is similar to the process described above with regard the third temperature zone.

The multifunction display 55 automatically switches between the forward view mode and the rear view mode in response to the proximity of the vehicle 15 to the trailer 20. Thus, the operator is capable of viewing the temperature of the space in the forward view mode from outside the cabin 25 when the vehicle 15 is detached from the trailer 20. Likewise, when the vehicle 15 is attached to the trailer 20, the operator is capable of viewing the temperature in the mirror view mode from inside the cabin 25 using the rear view mirror 30. The fuel portion 100 and the status portion 105 on the screen can be viewed by the operator in the forward view mode and the mirror view mode regardless of whether the vehicle 15 is attached to the trailer 20.

Various features and advantages of the invention are set forth in the following claims.

What is claimed is:

1. A display for a transport unit that includes a vehicle, a trailer defining a space, and a sensor in communication with the transport unit and operable to sense a parameter of the transport unit, the display comprising:
    a housing attachable to the trailer;
    a display portion coupled to the housing and including a screen configured to display the parameter; and
    a controller in electrical communication with the display portion to display the parameter on the screen, the controller programmed to selectively switch the display portion between a forward view mode and a mirror view mode such that the parameter is readable on the screen from outside the vehicle and from inside the vehicle based on a relationship between the vehicle and the trailer.

2. The display of claim 1, wherein the controller is programmed to switch the display portion between the mirror view mode and the forward view mode based on attachment of the vehicle and the trailer.

3. The display of claim 1, wherein the controller is operable to automatically switch the display portion between the mirror view mode and the forward view mode based on the relationship between the vehicle and the trailer.

4. The display of claim 1, further comprising an optical sensor coupled to the display portion to sense a quantity of light available adjacent the display portion, and wherein the controller is in communication with the optical sensor to adjust illumination of the screen in response to a change in the quantity of light available.

5. The display of claim 1, wherein the parameter is indicative of a temperature of the space.

6. The display of claim 1, wherein the parameter is indicative of a zone of the space.

7. The display of claim 1, wherein the trailer includes a fuel reservoir, and wherein the parameter is indicative of a fuel level of the fuel reservoir.

8. The display of claim 1, wherein the transport unit includes a temperature control unit coupled to the trailer, and wherein the parameter is indicative of a status of the temperature control unit.

9. The display of claim 1, further comprising a switch positioned adjacent the display portion, the switch being in electrical communication with the controller, wherein the switch is operable to emit a signal to sense the relationship of the vehicle with regard to the trailer, and wherein the controller is programmed to switch the display portion between the forward view mode and the mirror view mode based on the signal.

10. A method of displaying a parameter of a transport unit, the method comprising:
    providing transport unit including a trailer, and a vehicle attachable to the trailer;
    providing a controller coupled to the trailer, and a display in electrical communication with the controller;
    sensing the parameter with a sensor in communication with the transport unit and delivering a signal indicative of the parameter to the controller;
    displaying the parameter on the display; and
    automatically adjusting the display between a forward view mode and a mirror view mode based on a relationship between the vehicle and the trailer.

11. The method of claim 10, further comprising
displaying the parameter in the forward view mode;
moving the vehicle into substantial proximity to the trailer; and
automatically changing the display from the forward view mode to the mirror view mode in response to the vehicle being in substantial proximity to the trailer; and
displaying the parameter on the display in the mirror view mode.

12. The method of claim 11, wherein moving the vehicle into substantial proximity to the trailer includes attaching the vehicle to the trailer.

13. The method of claim 10, further comprising
displaying the parameter in the mirror view mode;
detaching the vehicle from the trailer; and
changing the display from the mirror view mode to the forward view mode in response to the vehicle being detached from the trailer; and
displaying the parameter on the display in the forward view mode.

14. The method of claim 10, further comprising dimming the display in response to a signal indicative of a change in a quantity of light adjacent the display from a sensor coupled to the controller.

* * * * *